United States Patent

Turner et al.

[11] Patent Number: 5,808,739
[45] Date of Patent: Sep. 15, 1998

[54] INTERFEROMETER HAVING COMBINED BEAM SPLITTER COMPENSATOR PLATE

[75] Inventors: Andrew Turner, Great Misseden; Henry Manifold Mould, Penn, both of England

[73] Assignee: Perkin-Elmer Ltd., Beaconsfield, England

[21] Appl. No.: 825,432

[22] Filed: Mar. 28, 1997

Related U.S. Application Data

[63] Continuation of Ser. No. 432,392, May 1, 1995, abandoned.

[30] Foreign Application Priority Data

May 9, 1994 [GB] United Kingdom .................. 9409064

[51] Int. Cl.⁶ ........................................................ G01B 7/02
[52] U.S. Cl. ............................................ 356/346; 359/637
[58] Field of Search .................................... 356/345, 346, 356/351, 358, 629, 636, 637

[56] References Cited

U.S. PATENT DOCUMENTS 5,172,186  12/1992  Hosoe ..................................... 356/358

FOREIGN PATENT DOCUMENTS

A0 491435  6/1992  European Pat. Off. .
A3 921816  1/1991  Germany .
2163548    8/1995  United Kingdom .

OTHER PUBLICATIONS

Journal of Scientific Instruments, vol. 41, 1964, pp. 225–226, R.S.Sternberg "A New Type of Michelson Interference Spectrometer", p. 225, left column, paragraph 3, right column, line 23, figure 1.

Applied Optics, vol. 20, No. 2, 15 Jan. 81 New York, US, pp. 335–342, D.J. Campbell et al. "Rapid Scan Modulator for Interferometric Applications".

Abstract, p. 337, right column, line 43–line 55, p. 340, right column, paragraph 2–paragraph 3; figures 5, 10.

*Primary Examiner*—Samuel A. Turner
*Attorney, Agent, or Firm*—David Aker; Edwin T. Grimes

[57] ABSTRACT

A Michelson-type interferometer which includes apparatus for producing a suitable collimated interferometer input beam; a beam splitter and recombiner for first splitting the input beam into two beams which have components arranged to travel along parallel forward paths and then to recombine them into a single output beam as they are returned along reverse paths to the beam splitter and recombiner; an OPD scanner for scanning the optical path difference between the two split beams travelling along said paths while substantially maintaining the parallelism between the components, and a beam reverser common to the parallel beam components for reversing their direction of travel along the reverse paths and returning them for recombination into the single output beam at the beam splitter and recombiner.

18 Claims, 7 Drawing Sheets

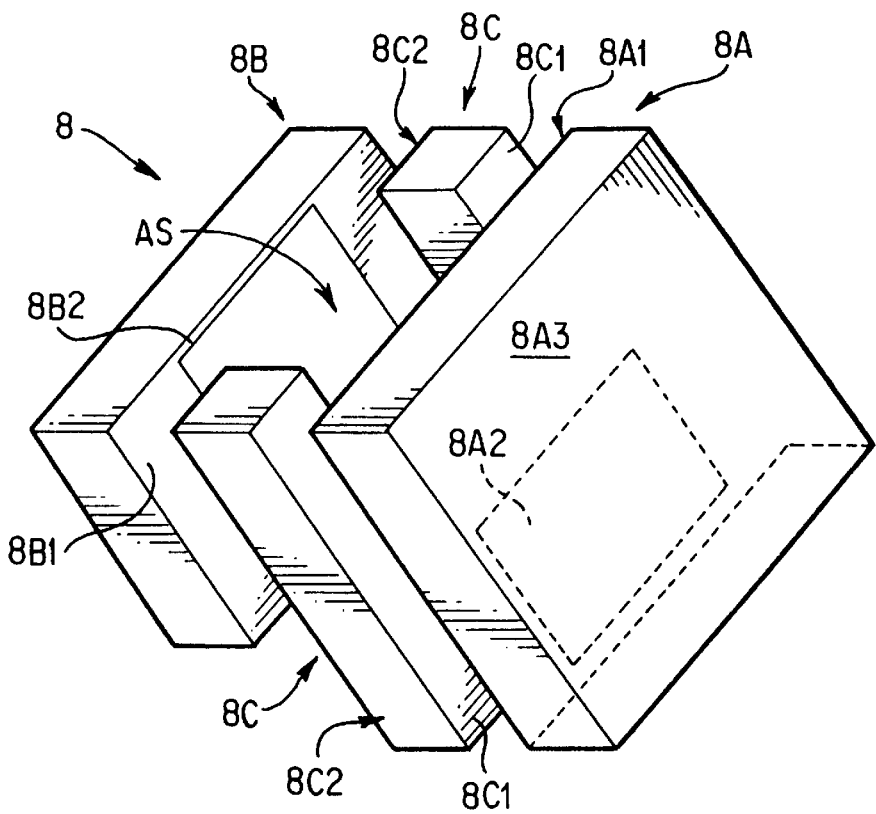
FIG. 3
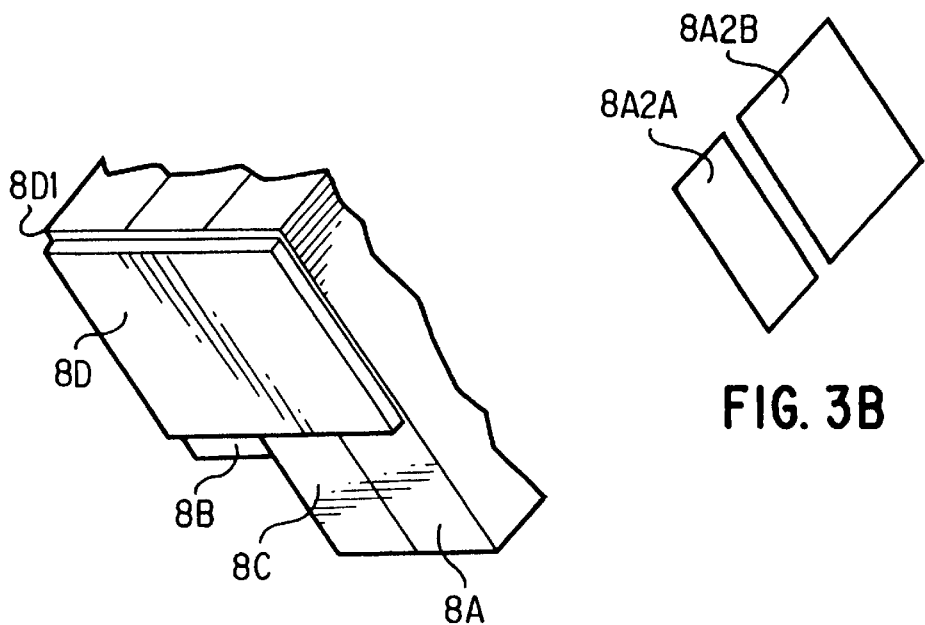
FIG. 3A
FIG. 3B ll
INTERFEROMETER HAVING COMBINED BEAM SPLITTER COMPENSATOR PLATE This application is a continuation of application Ser. No. 08/432,392 filed on May 1, 1995 abandoned.

TECHNICAL FIELD

This invention relates to optical interferometers, in particular interferometers suitable for incorporation in Fourier Transform (hereinafter FT) spectrophotometers, and FT spectrophotometers incorporating them, in particular high-stability FT spectrophotometers, such as may be employed in situations where stability is of primary importance, e.g. in chemical plant monitoring.

BACKGROUND ART

The term "interferometer(s)" shall hereinafter refer exclusively to optical interferometer(s) and all derivatives of the term shall likewise relate to optical interferometry.

The stability requirement of a conventional FT spectrophotometer intended for the routine analyses of chemical samples in the laboratory is readily satisfied because the operational environment is often ideal and the required stability, largely depending on the optical stability of its interferometer, need only be maintained over comparatively short periods. This is not the case where the analysis is aimed at monitoring the intermediate and final products of a chemical engineering plant or, indeed, the chemicals used in any plant where the performance of a manufacturing process depends on the periodical or continuous monitoring of the said chemicals, often in situations where continuous processes are involved.

In the context of this specification, the phrase "product monitoring" is intended to refer to the periodic or continuous testing of a chemical product in order to derive data, via an FT spectrophotometer, which can be used for the purpose of maintaining the product within a given specification, either by manual or automatic control, and/or providing a timely alarm in situations where one or more product parameters has/have gone outside predetermined tolerances; and the term "stability" is used in the main with reference to an interferometer per se and any of its components, or to an FT spectrophotometer incorporating it, to refer to the comparative unchangingness, over a protracted period, of those factors, such as optical alignment, on which the sustained satisfactory performance of the interferometer, and hence of the FT spectrophotometer as a whole depends.

The high stability requirement of product monitoring is largely dictated by the fact that the monitoring apparatus must operate reliably with a minimum of human intervention and must therefore be capable of tolerating the kind of perturbations that are likely to occur on the installation site. High stability in the face of an aggressive environment means that particular attention must be given to the structuring and arranging of the critical optical components of the interferometer incorporated in the FT spectrophotometer, in order to render them comparatively insensitive to a number of possible and likely environmental disturbances and thus ensure long periods of trouble-free operation unmarred by stoppages for servicing, e.g. optical re-alignment, of the said components.

It has been found that available highly sophisticated FT spectrophotometers designed for laboratory use fail to meet the stringent requirements of product monitoring in terms of stability, simplicity, ruggedness of construction. Such instruments are intended to provide a versatility which is not required in product monitoring and leads to complexities that renders them more susceptible to disturbances.

An FT spectrophotometer for general laboratory use typically includes an interferometer of the Michelson type which essentially comprises a source providing a continuum of radiation (hereinafter photometric radiation) in the wavelength band of analytical interest and co-operating with a collimator to generate an input beam of near parallel rays; a beam splitter for splitting the input beam from said source into a reflected and a transmitted split beam, each travelling along a forward path orthogonal to that of the other; an optical path difference (hereinafter OPD) scanning arrangement in the path of at least one split beam; two orthogonally disposed return mirrors, each returning one split beam to the beam splitter along a return path coincident with the forward path of said split beam for the purpose of recombining the two split beams at the beam splitter; and a detector for measuring the intensity of the centre interferometric fringe of the recombined beam.

In the foregoing paragraph it is assumed that the input beam meets the beam splitter at 45 degrees. A different angle of incidence may, of course, be used, but then the planes of the two return mirrors will intersect at an angle of other than 90 degrees.

The device referred to as "beam splitter" is well known in the interferometric art. Its initial purpose is to split the interferometer input beam into two split beams, each retaining approximately half the intensity of the input beam. In one example, the beam splitter may include a well calendered thin film of a suitable plastics material held taut by a beam splitter supporting means, such as a surrounding stretching frame; in another example, it may include a thin layer semitransparent to the photometric radiation made of a suitable material (e.g. silver) laid upon an optically flat face of a rigid substrate essentially pervious to the photometric radiation.

If we take the simple case of a semi-transparent silver layer, a first split beam will be generated by partial reflection of the input beam incident upon the layer and a second split beam by partial transmission through the layer. At recombination, part of the reflected split beam passes through the layer and part of the transmitted split beam is reflected from the layer, with the result that as the former emerges from the layer it meets the latter and the respective wavefronts overlap and interfere. Thus a semi-transparent beam splitting layer is capable of performing in the dual role of beam splitting and recombining an interferometer input beam.

It should be understood that the terms "scan", "scanning", "scanner", as used herein, are intended to relate to the generation of a continuous series of optical path differences between the two split beams, within a predetermined range, usually expressed in centimeters.

OPD scanning arrangements are known in which one of the return mirrors referred to earlier in outlining a regular Michelson-type interferometer is kept stationary and the other is translated rectilinearly along the return path of the associated split beam. Such arrangements require very high mechanical accuracy because any tilt in the rectilinear motion that translates into a significant fraction of the shortest photometric radiation wavelength within the applicable wavelength limits is unacceptable, in that it would impair accurate spatial overlap of the wavefronts of the respective beam components in the interferometric recombination process at the beam splitter. It has been found that the required accuracy can be more easily attained and maintained by substituting an OPD scanner in the form of a rotary pair of parallel mirrors, such as disclosed in U.S. Pat. No. 2,163,548, which is imported in full into the present application and shall hereinafter be referred to as Imported Patent.

However, it is still common practice to make use of two separate return mirrors, which means that the spatial relationship of the two specular faces and the beam splitter must be accurately predetermined and maintained, bearing in mind that any perturbation affecting only one mirror, or both mirrors in a non-self cancelling manner, will prevent proper overlap of the interfering wavefronts of the two split beams respectively. It is not uncommon, for example, to support the return mirrors on a rigid interferometer frame machined from a casting, which means that the spatial relationship between the mirrors can be significantly affected by certain distortions of the frame produced by environmental causes, such as thermal cycling, mechanical vibrations, etc. In a laboratory instrument the effect of such causes upon the comparatively short term stability required can be tolerated, but that is not the case where the instrument is intended to perform a task requiring that high stability be maintained over protracted periods in the face of considerable perturbations.

SUMMARY OF THE INVENTION

The object of the invention is to provide interferometers and FT spectrophotometers incorporating them wherein the optical components of the interferometer are constituted and arranged to provide good performance accompanied by enhanced stability.

According to the invention there is provided a Michelson-type interferometer comprising:

a) means for producing a suitably collimated interferometer input beam;

b) beam splitter and recombiner means for first splitting the said input beam into two parallel split beams travelling along parallel forward paths and then recombining them into a single output beam as they are returned along parallel reverse paths to the beam splitter and recombiner means;

c) OPD scanning means for scanning the optical path difference between the two parallel split beams travelling along said parallel paths while substantially maintaining the parallelism therebetween;

d) beam reversing means common to both parallel split beams for reversing their direction of travel along said reverse paths and returning them for recombination into said single output beam at the beam splitter and recombiner means.

With regard to the collimated nature of the interferometer input beam, it is well known, of course, that true collimation of a beam issuing from a source of finite radiating area by means of a collimating optical element is unpracticable, in that the conversion of the spherical waves emanating from the source into true plane waves is only theoretically possible if the radiation source is a true point source, which would not however provide sufficient energy throughput to be useful in FT spectrophotometry or, indeed, other practical applications.

In the context of the present specification, the phrases "optically flat" and "accurately parallel" shall be understood to refer to flatness and parallelism, respectively, to an appropriate fraction of the shortest wavelength in which the photometric radiation is present in the input beam. For example, flatness or parallelism to one tenth of a wavelength is modest compared with one hundredth, which is high.

In the description that follows the term "interferometer" shall be understood to relate to an optical interferometer generally, unless the context is specifically directed to FT spectrophotometry. Where the timing of interferometric data collection is governed by an auxiliary inteferometer, the interferometer proper shall be referred to as main interferometer and its auxiliary as the reference interferometer. If the distinction between the two applies but need not be made in a given context, the term interferometer, in the singular, shall refer to their combination without prejudice to their respective functions.

The beam splitter and recombiner means may include means for splitting the input beam into a first split beam travelling along a predetermined path deviating from that of the input beam and into a second split beam initially travelling along a path co-directional with that of the input beam, and further includes path changing means for re-directing the path of the second split beam towards a path parallel to the predetermined path, in order to generate the two parallel split beams travelling along parallel forward paths.

More specifically, the beam splitter and recombiner means may include: means for splitting the input beam in the form of a beam splitting and recombining layered structure adhering to a rigid support pervious to the photometric radiation for producing the first split beam and the second split beam by partial reflection and transmission, respectively, of the input beam and for deflecting said first split beam into said predetermined path whilst allowing the second split beam to go through along a path offset from but parallel to that of the input beam; said rigid support having two opposed optically flat surfaces, one an upstream surface providing an entry area for the input beam and a separate exit area for the deflected first split beam and the other a downstream surface for supporting the layered structure; and path changing means in the form of an optically flat backing mirror for re-directing the second split beam towards a path parallel to the said predetermined path, said backing mirror having a mirror layer spaced from the layered structure, in accurately parallel relationship, within an intervening air gap of predetermined width that governs the spacing between the parallel optical paths.

The backing mirror may be arranged to deflect the second split beam towards a path parallel to the predetermined path of the first split beam via a region of the rigid support clear of the beam splitting and recombining layered structure, whereby the rigid support may act as an optical path compensator by virtue of the fact that the retardation suffered by the first split beam in traversing the rigid support after being reflected may be matched by the retardation suffered by the second split beam.

The layered structure may include a single layer, such as a continuous semi-transparent layer or a discontinuous, e.g. foraminous, non transparent layer; it may also be multi-layered, such as a composite of superimposed layers of different materials.

The optically flat rigid support may be in the form of a first parallelepipedal slab pervious to the input beam, the two major surfaces of the slab being optically flat and the said layered structure being located in one predetermined region of one of them, so as to allow the re-directed transmitted split beam a clear passage through the slab in an adjacent region for the purpose of optical path length compensation.

The backing mirror may comprise a backing mirror layer adherent to one of the two major surfaces of a second parallelepipedal slab, the said one surface being optically flat.

The first parallelepipedal slab may be spaced from the second parallelepipedal slab by spacer means ensuring that the surface of the former that bears the layered structure faces, in accurately parallel relationship, the surface of the latter that bears the backing mirror layer.

The spacer means may comprise a pair of spacers in the form of spacing bars, e.g. parallelepipedal spacing bars, each provided with two optically flat and accurately parallel longitudinally opposed working surfaces, one in permanent optical contact with the surface of the first slab bearing the layered structure and the other in permanent optical contact with the surface of the second slab bearing the backing mirror layer, whereby the layered structure, the first slab bearing the layered structure and additionally acting as a compensator, the backing mirror layer and its supporting second slab constitute an optically pre-aligned beam splitter and recombiner monolithic unit. The phrase "optical contact" is well understood in the optical art generally.

The slabs and spacers may all be made of a high mechanical stability material, such as optical grade fused silica, thus further enhancing the inherent stability of the monolithic structure.

The OPD scanner may be in the form of a pair of face-to-face accurately parallel and optically flat mirrors mounted for rotation as a preset assembly around an axis essentially parallel to the mirrors.

Each mirror may comprise a parallelepipedal slab each having an optically flat major surface bearing a mirror layer, spacer means providing an accurately parallel relationship between the mirror layer bearing surfaces, similarly to what has been described with respect to the beam splitter and recombiner units, thus realizing an OPD scanner monolithic unit.

The beam reversing means common to both parallel split beams may take the form of a single optically flat return mirror for receiving both parallel beams and reversing their direction of travel towards the beam splitter and recombiner unit for recombination at the beam splitter.

The parallelism of the optical elements that hereabove are specified as "accurately parallel" is of particular importance. It should be high enough to ensure satisfactory spatial coincidence of the wavefront of one split beam with the wavefront of the other split beam as the beams are recombined. Any significant departure from coincidence will affect the optical amplitude modulation of the central interference fringe generated by the interferometer and thus will lower the sensitivity of interference fringe detection.

Parallelism of the said optical elements within the monolithic units may be preset to render it virtually unaffected by the usually troublesome dimensional perturbations of the means, such as interferometer frame or base plate, for supporting said units. Such perturbations can only affect the spacing between the monolithic units and between the OPD scanner and the beam reversing means. However, the said spacing is not critical in that the use of beam reversing means common to both parallel beams ensures that within limits, which are wide in interferometer terms, the parallel beams are equally affected and their recombination is not impaired. This contrasts with any prior art arrangement wherein two return mirrors are used which are mounted directly on a common inter ferometer support means. There is a spatial inter-relationship linking the two return mirrors and the beam splitter which is invariably critical, and if that is affected by perturbations of the interferometer support means, accurate beam recombination cannot take place.

Implementing the beam splitter and recombiner units and the O.P.D scanner in the form of two monolithic units cooperating with a single return mirror enables a high level of stability to be maintained for protracted periods.

An interferometer in accordance with the present invention may be linked to a remote station from which photometric radiation modulated by a sample thereat, e.g. a flowing product in a manufacturing process, may be transmitted to the optical input of the interferometer by means of an optical fibre. If the interferometer forms part of an PT spectrophotometer, the arrangement is particularly suitable for product monitoring, in that it widens the choice of where the spectrophotometer proper may be located so as to avoid as far as possible particularly aggressive environments.

Applications such as product monitoring do not require the comparatively large interferometer etendue (optical throughput) associated with FT spectrophotometers intended for general laboratory use. This means that a single optical fibre of comparatively small diameter, say, between 0.1 and 0.6 mm, may be used. The etendue (hereinafter etendue) associated with such fibre makes possible a comparative miniaturization of the optical constituents of the interferometer, which itself contributes to the stability of the interferometer as a whole. Fibres providing larger etendues may be desirable, of course, if the higher cost can be justified.

However, in applications which do not involve remote sampling it may be beneficial to provide much larger etendues, closer to those of general purpose laboratory instruments.

In the Michelson-type interferometer in accordance with the invention as hereinbefore outlined, the input beam is provided by a suitable source of photometric radiation and the output beam issuing from the interferometer is received by a suitable detecting device. The locations of the source and the detecting device are, of course, reversible in accordance with the optical reversibility principle. This means that the path changing means co-operates with the split beam that is transmitted through the beam splitter (identified earlier as the second split beam) if the locations are as normally shown in representing a Michelson interferometer and co-operates with the reflected split beam (identified earlier as the first split beam) if the locations are reversed.

BRIEF DESCRIPTION OF THE DRAWINGS

The invention will now be described in greater detail with reference to the accompanying diagrammatic drawings, wherein:

FIG. 3 is an exploded perspective view of a beam-splitter-and-recombiner monolithic unit that may be advantageously incorporated in the interferometer of FIG. 2;

FIG. 3A is a modification of FIG. 3;

FIG. 3B is another modification of FIG. 3;

FIG. 6A represents a detail of FIG. 6 on an enlarged scale;

FIG. 7A is an exploded view of a detail of FIG. 7.

DETAILED DESCRIPTION OF THE PREFERRED EMBODIMENTS

Figure 1:
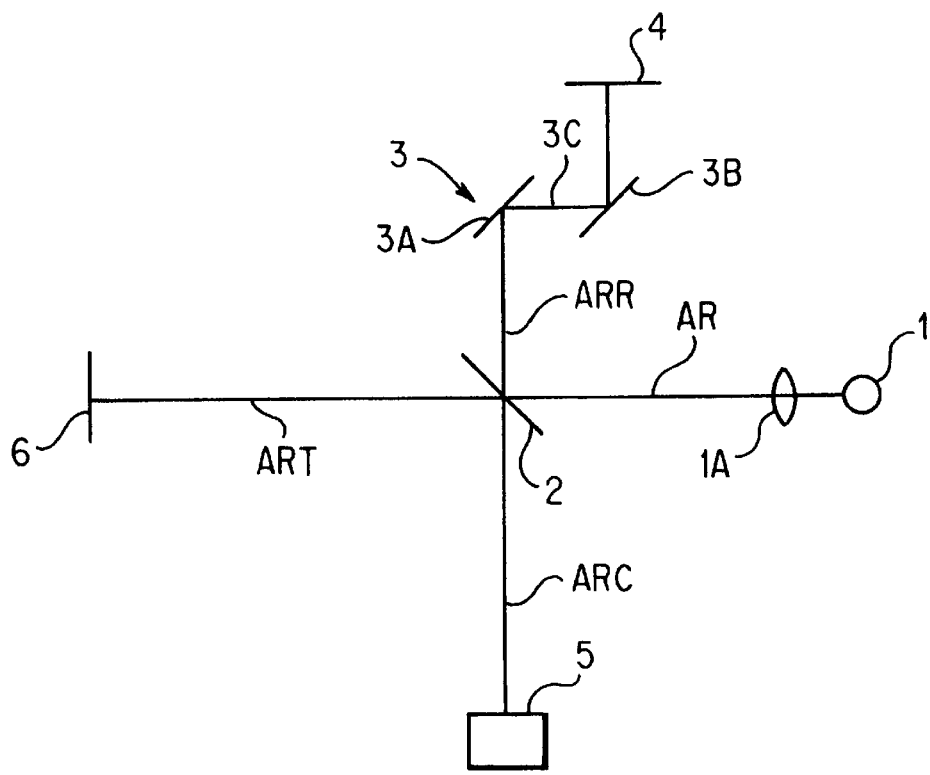
FIG. 1 is a schematic representation of a prior art optical Interferometer incorporated in a prior art FT spectrophotometer.

For a better understanding of the advancement in the interferometric art, particularly as applied to FT spectrophotometry, achieved by the present invention, the interferometer incorporated in a prior art FT spectrophotometer will now be outlined with reference to FIG. 1 by following the path of the axial ray AR of a paraxial beam emerging from a collimator 1A of photometric radiation emitted by a source 1 capable of generating a continuum of radiation in a given spectral range of analytical interest. The ray AR first meets an optically flat beam splitter 2 at an angle of 45 degrees, with the result that about 50% of the ray intensity is reflected therefrom at 90 degrees and 50% is transmitted therethrough. The reflected AR ray portion is referenced ARR (acronym for Axial Ray Reflected) and the transmitted portion ART (acronym for Axial Ray Transmitted).

ARR undergoes two right-angles deflections by passing through an OPD scanner 3 in the form of a rotatable mirror assembly comprising face-to-face accurately parallel and optically flat mirrors 3A and 3B. The ray ARR emerges from the OPD scanner 3 in a direction parallel to that in which it entered it and impinges on a first return mirror 4, which causes ARR to retrace its path back to the beam splitter 2.

ART, on the other hand, has a clear forward path to a second return mirror 6, by which it is reflected back to the beam splitter 2 along a return path coincident with the forward path, as in the case of ARR.

The parallel mirrors 3A and 3B of the OPD scanner 3 are mounted for rotation as an assembly around an axis 3C intermediate therebetween and at right angles to the plane of the paper. With the OPD scanner 3 in the position shown (hereinafter referred to as mid-scan position), the optical path length between the beam splitter 2 and the first return mirror 4 is identical with that between the beam splitter 2 and the second return mirror 6. Clockwise rotation of the OPD scanner 3 from the mid-scan position causes the optical path length between the beam splitter 2 and the return mirror 4 to increase with respect to the fixed optical path length between the beam splitter 2 and the return mirror 6 and anti-clockwise rotation causes it to decrease. The function of the OPD scanner 3 is, therefore, to cause the difference between the two optical path lengths to change over a predetermined range corresponding to an angular motion of the scanner between clockwise and anti-clockwise predetermined limits.

Although the effect of scanning the OPD is described at length in the Imported Patent, along with other background details on the relevant interferometric art, an outline of the recombination process is given herewith for the convenience of the reader.

In correspondence of the mid-scan position, each constituent of the entire spectral range of photometric radiation emanating from the source 1 is split into two portions, one contributing to ray ARR and the other to ray ART. Because of the equality of optical path lengths referred to hereabove, the two portions are returned to the beam splitter 2 in phase coincidence and, consequently, their intensities add up by constructive interference. In other words, each pair of split portions undergoes recombination to form, collectively, a ray ARC the intensity of which as "seen" by the photodetector 5 is approximately equal to that of the unsplit ray AR.

At any OPD scan position other than mid-scan, the intensity of the ARC ray as "seen" by the photodetector 5 depends on the phase established between the two split portions of each pair at recombination. The intensity contributed by each pair varies from a maximum at phase coincidence (constructive interference) to a minimum at phase opposition (destructive interference). The difference between theoretical maxi-run and actual intensities is re-directed to the source 1.

In the prior art arrangement outlined with reference to FIG. 1, the mirrors 4 and 6 are mounted on a common frame (not shown) and their orthogonality must be set and maintained to an accuracy relatable to a small fraction of the shortest wavelength in which radiation is present an the rays emanating from source 1. The tilt tolerance of general purpose FT spectrophotometers is typically one or two arc-seconds. The beam splitter 2 is also mounted on the common frame and its spatial relationship with each of the mirrors 4 and 6 must likewise be accurately determined and maintained.

Figure 2:
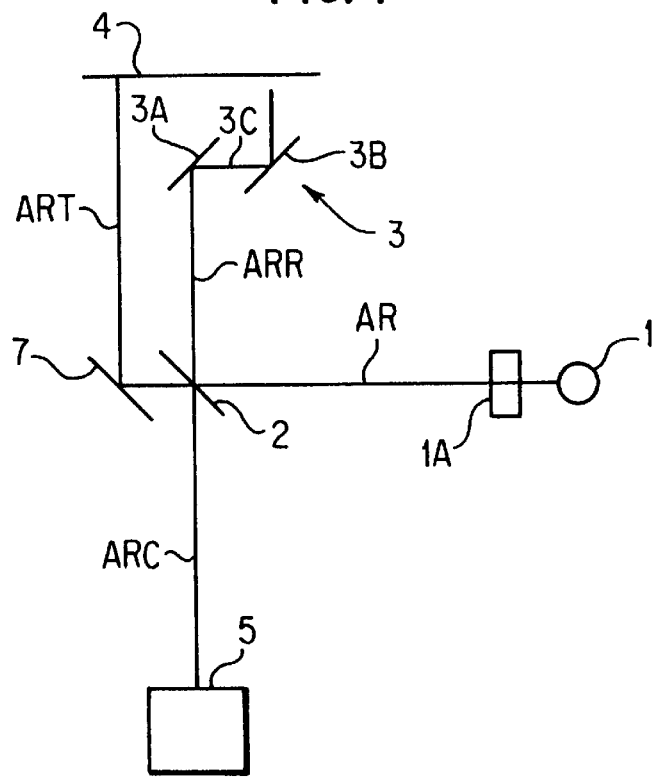
FIG. 2 is a schematic representation of an optical interferometer in accordance with the invention suitable, inter alia, for incorporation in an FT spectrophotometer.

An interferometer in accordance with the invention, but not necessarily associated with an FT spectrophotometer, is outlined in FIG. 2 in a schematic form similar to that of FIG. 1. Like elements in the two figures are denoted by like references, except that the photodetector 5 in FIG. 1 is to be regarded as an interferometer output device 5 in FIG. 2, in that in the latter figure it could be a photodetector, as in the case of FIG. 1, but it could also be something else, e.g. a screen for viewing the interferometric fringes, depending on the application for which the interferometer is intended.

In FIG. 2, the forward path of ray AR from source 1 to return mirror 4 via collimating means 1A, beam splitter 2 and OPD scanner 3, as well as the return path from mirror 4 to the output device 5 via OPD scanner 3 and beam splitter 2 are matched by the like paths In FIG. 1. However, return mirror 6 (FIG. 1) has been dispensed with and, as a result, the troublesome orthogonal alignment between mirror 4 and mirror 6 (FIG. 1) has been avoided altogether. This has been achieved by introducing a backing mirror 7, in accurately parallel spaced relation to the beam splitter 2, to deflect the transmitted portion of ray AR, i.e. ray ART, onto the mirror 4. The parallel relationship between backing mirror 7 and beam splitter 2, ensures that ART travels to and from the mirror 4 parallel to ARR.

The beam splitter 2 is of the type comprising a semi-transparent beam splitting and recombining layer (hereinafter beam splitting layer) and in fact it is involved in the performance of both functions, in a manner that will be presently described. It could be referred to as beam splitter and recombiner but the shorter form has been adopted for the purposes of the present description, without prejudice, however, to dual role performed by the said layer. The beam splitter 2 and the backing mirror 7 are part of the "beam splitter and recombiner means" introduced earlier.

It will be appreciated that the single return mirror 4 constitutes a specific form of the aforementioned "beam reversing means common to both parallel beams", the parallel beams being the split beams of which ARR and ART are the axial rays, respectively.

The co-operation of the single mirror 4 with the parallel split beams in the arrangement outlined in FIG. 2 paves the way to the realization of additional features for enhancing interferometer performance, in particular sustained stable performance, by making it substantially insensitive to the effect of any perturbations suffered by the means for supporting the optical elements of the interferometer in predetermined spaced relation.

Accurate wavefronts overlap calls for accurate parallelism between beam splitter 2 and backing mirror 7 and between mirrors 3A and 3B of OPD scanner 3. The generalities stated for the OPD scanner 3 of FIG. 1 equally apply to the OPD scanner 3 of FIG. 2. In one particular realization of the interferometer in accordance with the invention, comparative insensitivity to disturbances affecting parallelism is enhanced by implementing the function of the beam splitter 2 and backing mirror 7 in a beam splitter and recombiner monolithic unlit, and the function of mirrors 3A and 3B in an OPD monolithic unit.

In each monolithic unit, parallelism is preset and maintained in a manner totally independent of the means for supporting the monolithic units in spaced relation, i.e. baseplate or frame. This contrasts with the prior art arrangement of FIG. 1, wherein the orthogonality of the return mirrors 4 and 6 is affected by perturbations of a common frame to an extent that is not acceptable in high stability interferometers. However, some perturbations may slightly alter the spacing between the two monolithic units or between the OPD monolithic unit and the single return mirror 4, but because ARR and ART are both received and returned by mirror 4 as two parallel rays, the effect on the recombination of the split beams is insignificant. In fact, the spacing tolerance achievable is such that at the factory the monolithic units and the single return mirror may be simply located in position by urging them against machined abutments under light spring pressure—the machining accuracy which can readily be achieved in manufacture, and which is far lower than would be normally associated with interferometric devices, being quite adequate for the purpose.

The beam splitter and recombiner monolithic unit and the OPD monolithic unit will now be described in detail with reference to the exploded views of FIGS. 3 and 4, respectively.

In FIG. 3 the functions of the beam splitter 2 and the backing mirror 7 shown in FIG. 2 are met by a beam splitter and recombiner monolithic unit 8 forming a mechanically and chemically stable structure comprising two cooperating parallelepipedal slabs 8A and 8B held in spaced relation by identical thicknesses of elongated parallelepipedal spacers 8C, the slabs and the spacers being approximately 1 cm thick.

The splitting function is performed by a semi-transparent beam splitting layer 8A2 adherent to the inner face 8A1 of the slab 8A. Spaced from the slab 8A is the parallelepipedal slab 8B. The backing function is performed by a backing mirror layer 8B2 adherent to the face 8B1 of slab 8B. Opposed faces 8A1 and 8B1 are optically flat and accurately parallel. Parallelism therebetween is achieved in a highly stable manner by interposing the two elongated parallelepipedal spacers 8C, the opposite working faces of which, 8C1 and 8C2, are optically flat and accurately parallel. The spacers 8C are located at opposite lateral extreme regions of the facing slabs 8A and 8B so as to leave an unencumbered air space therebetween, which is pointed to by the arrow AS. Slabs 8A, 8B and spacers 8C are preferably made of the same material to minimize the effect of differential thermal expansion on the stability of the monolithic unit 8 as a whole. The choice of the material is essentially determined by the fact that slab 8A must be pervious to the input beam radiation within the wavelength range of interest.

Adherence between slab face 8A1 and spacer faces 8C1 is achieved by bringing the co-operating faces into abutment and relying on the effectiveness of the bond between optically worked surfaces in close contact, which in this specification is referred to as optical contact. Similarly, slab face 8B1 is made to adhere to spacer faces 8C2. Joining optically worked faces by optical contact is a well known method of assembly in optical engineering.

The primary function of the slab 8A is to provide a stable support for the layer 8A2. However, it serves an additional important purpose. It might be thought that slabs 8A and 8B should be staggered along the spacers 8C so as to allow the ray ART (FIG. 2) to reach the return mirror 4 (FIG. 2) and reverse from it without undergoing refraction, as in fact shown in FIG. 2. If that were done, and the ART ray were not refracted through slab 8A at the generally clear area marked 8A3, the optical path lengths of the two split rays ARR and ART (FIG. 2), as distinct from their geometrical path lengths, would not be identical when the OPD scanner 3 (FIG. 2) was in its mid-scan position because ART would not suffer retardation through the slab 8A but ARR would. By adopting the layout of FIG. 3, wherein ray ART is reflected by the backing mirror layer 8B2 so as to be directed through the clear portion 8A3 of slab 8A, above beam splitting layer 8A2, both split rays undergo retardation to the same extent and, therefore, constructive interference takes place with the OPD scanner 3 (FIG. 2) in its mid-scan position. In other words, the slab 8A acts both as a support for the layer 8A2 and an optical path length compensator equalizing the optical path lengths of the split beams ARR and ART when the OPD scanner 3 is at mid-scan. It is worthy of note that compensation is correct for all wavelengths of the photometric radiation. No compensation is, of course, required if the beam splitting layer is not supported on a thick substrate causing a substantial disparity of optical path lengths. In FIG. 2, the beam splitter 2 Is not backed by a thick support, which means that the equalization of geometrical path lengths alone (as distinct from optical path length) is adequate in practice and any slight retardation caused (such as due to a thin supporting substrate) may be compensated for by slightly offsetting the mid-scan position. The path of the rays ARR and ART passing through the monolithic unit 8 will be followed later, with reference to FIG. 5.

Figure 4:
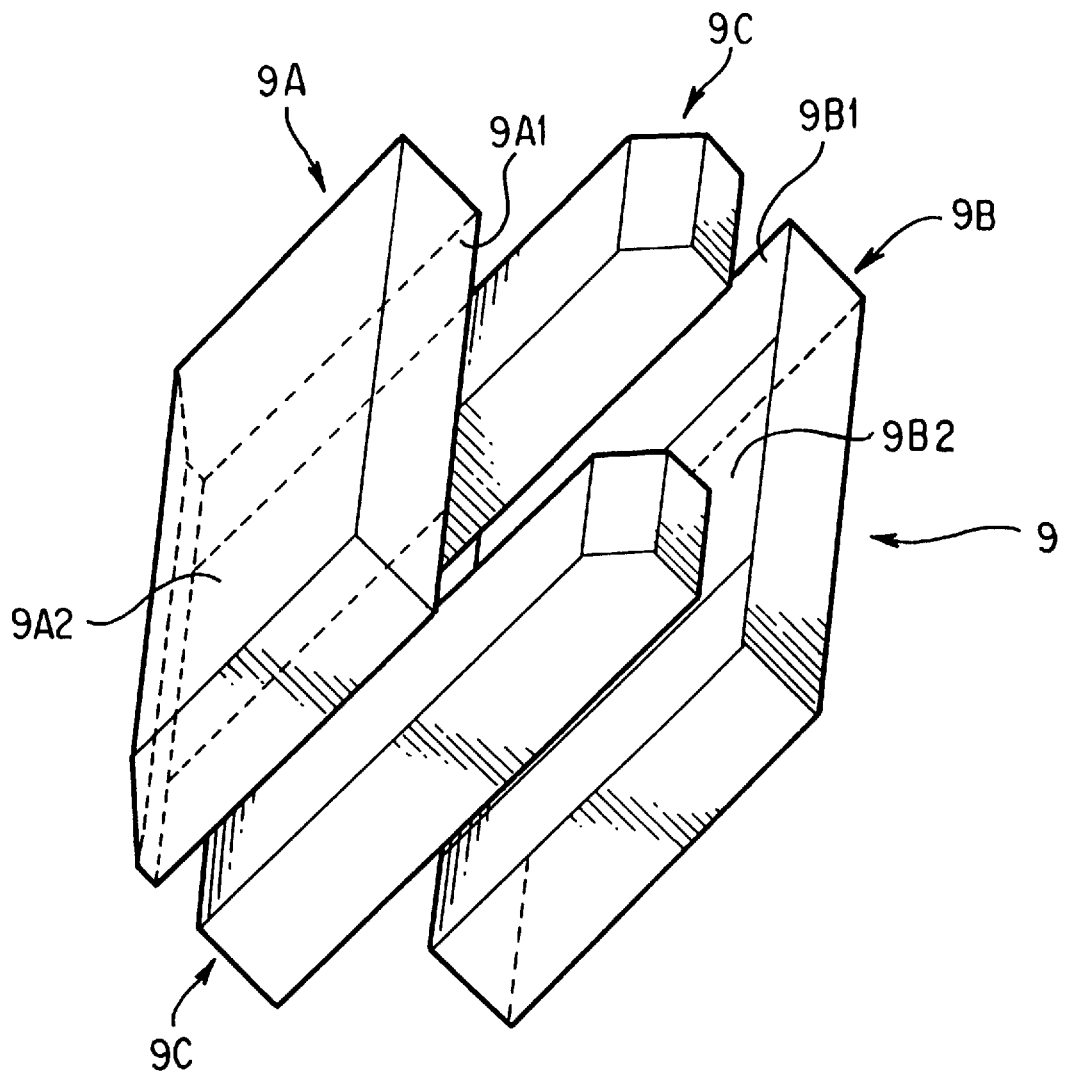
FIG. 4 is an exploded perspective view of an OPD scanner monolithic unit that may be advantageously incorporated in the interferometer of FIG. 2.

In FIG. 4 the function of the OPD scanner 3 (FIG. 2) is performed by an OPD scanner monolithic unit 9, which in general structural terms is similar to the monolithic unit 8 described hereabove with reference to FIG. 3, in that spacers 9C, similar in shape to spacers 8C, except for being bevelled as shown, maintain two parallelepipedal slabs 9A and 9B spaced apart in accurately parallel relationship in the manner in which spacers 8C maintain such relationship between slabs 8A and 8B in FIG. 3. The inner faces, 9A1 and 9B1, of slabs 9A and 9B, respectively, are each provided with a mirror layer, 9A2 and 9B2. Staggering of the slabs 9A and 9B has been provided to permit unobstructed entry and exit of the ARR ray (FIG. 2) for any OPD scan angle of unit 9 within the design range. The optical requirements, in terms of flatness and parallelism stated for the monolithic unit 8 (FIG. 3) equally apply to the monolithic unit 9, but, unlike slab 8A in FIG. 3, the slabs 9A and 9B need not be pervious to the photometric radiation from source 1 (FIG. 2), of course. The path of the ARR ray passing through the monolithic unit 9 will be followed with reference to FIG. 5.

Because units 8 and 9 are similar, the same material and the same skills may be used in their realization. In fact, the same process may be employed for producing slabs and spacers each with working faces that are accurately flat and parallel. Such faces permit the slabs to be joined to the spacers by optical contact, which, compared to other methods of securing retention, is less likely to induce strain leading to an impairment of optical accuracy. In order to establish and maintain proper optical contact between the co-operating optically worked surfaces, it is essential to ensure that they are chemically clean and free from any intervening extraneous particles before they are brought together. Layers 8A2 and 8B2 of unit 8 as well as layers 9A2 and 9B2 of unit 9 must each be confined to a permitted region of the supporting surfaces outside the optical contact areas involving spacers 8C and 9C. In FIG. 3, layer 8A2 shares the permitted region with the clear space 8A3, and layer 8B2 occupies the whole of the permitted region, as is the case with layers 9A2 and 9B2, respectively, in FIG. 4. Optical grade fused silica has been used successfully in the manufacture of units 8 and 9.

Although optical contact is known to be a reliable method of maintaining adherence between optically flat surfaces and, in fact, it has been used even in airborne equipment, there may be situations where an interferometer in accordance with this invention is to be operated in a particularly disturbed environment wherein the occurrence of shock waves reaching unpredictably high peaks capable of causing optical contact failure cannot be ruled out.

Optical contact is known to resist much larger separating forces acting approximately along the normal to the abutting surfaces compared to forces acting in shear along the plane of said surfaces. It is, therefore, proposed to reduce the risk of optical contact failure under extreme circumstances by providing bridging means assisting the optical contact action in resisting forces in shear. The bridging means are applied on the manner depicted in FIG. 3A, wherein a bridging plate 8D binds together the longitudinal outer side of spacer 8C and the flanking sides of slabs 8A and 8B co-planar therewith, by means of a suitable adhesive layer 8D1 interposed between the plate 8D and the co-planar sides. The arrangement is duplicated at the lateral end of monolithic unit 8 opposite to that shown in FIG. 3A. A Dow Corning silicate rubber adhesive has been used to form the adhesive layer 8D1.

An interferometer in accordance with the invention, representing an elaboration of that outlined with reference to FIG. 2 that is achieved by incorporating the monolithic units 8 (FIG. 3) and 9 (FIG. 4), will now be described with reference to FIG. 5, which provides a basic optical interferometer layout adaptable for diverse and demanding applications, of which the replacement of the interferometer initially included in the FT spectrophotometer of the Imported Patent will be given as an example.

In the description that follows all figure numbers and drawing references relating to the Imported Patent will be distinguished by the suffix (i.p.) from those relating to the present specification. Unless otherwise indicated, all drawing references marked (i.p.) relate to both FIG. 4 (i.p.) and FIG. 5 (i.p.).

The optical input means for the interferometer disclosed in the Imported Patent, beginning with the source 1 (i.p.) and ending with the parabolic mirror 20 (i.p.), are incorporated in the present embodiment. They are described from page 25, line 13, to the end of page 26 of the Imported Patent. Also incorporated are the laser 25 (i.p.), the mirrors 26 (i.p.), 28 (i.p.) and 29 (i.p.), the ⅛ wave plate 30 (i.p.) (hereinafter ⅛ plate 30 (i.p.)), the laser beam sensing unit 27 (i.p.), the parabolic mirror (22 (i.p.), the sample carrier 23 (i.p.), the elliptical mirror 24 (i.p.) and the detector 9 (i.p.). The presence of the laser beam in place of a substantial part of the core of the main interferometer beam naturally means that the etendue of the main interferometer must be sufficient to allow the consequent loss of main interferometer throughput to be tolerated. The FIG. 5 embodiment is intended for general applications and it can tolerate the merging of the two interferometer beams in the manner disclosed in the Imported Patent (see page 29, lines 11–16).

Figure 5:
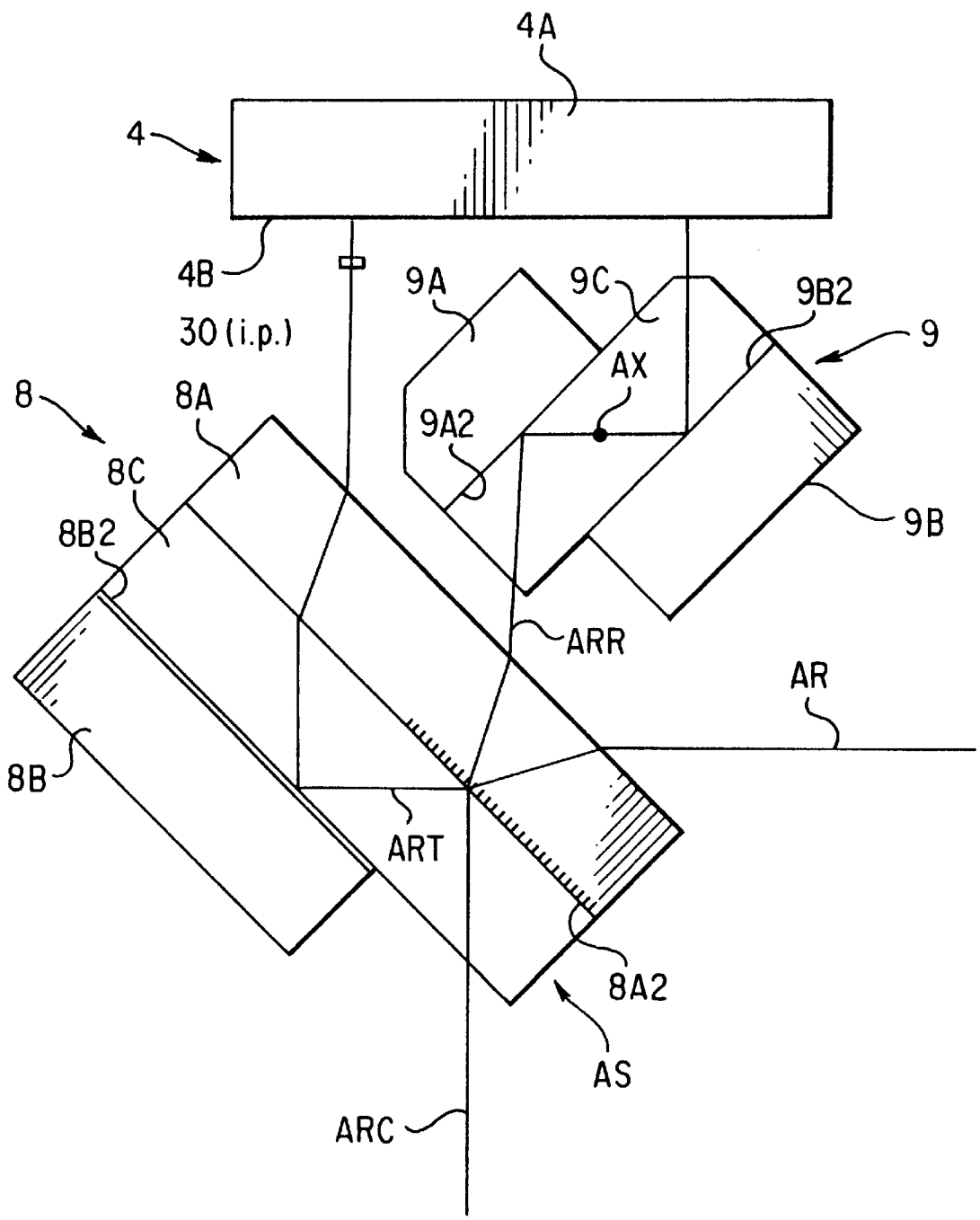
FIG. 5 is a plan view of an interferometer, in accordance with the invention, including the monolithic units depicted in FIGS. 3 and 4.

Shown in FIG. 5, in assumed proper spaced relation with the collimating parabolic mirror 20 (i.p.), is the beam splitter and recombiner monolithic unit 8 of FIG. 3 hereof, comprising slabs 8A, 8B and spacers 8C; and above it is the single return mirror 4, in the form of a fused-silica parallelepipedal block 4A supporting a mirror layer 4B upon which an image of aperture 17A(i.p.) is formed by parabolic mirror 20 (i.p.). The OPD scanner monolithic unit 9 of FIG. 4, comprising slabs 9A, 9B and spacers 9C, is shown between the monolithic unit 8 and the return mirror 4 at the mid-scan position corresponding to an angle of rotation around axis AX approximately midway between the clockwise and anti-clockwise angles of rotation representing the scanning limits. Between the monolithic unit 8 and the single mirror 4, in the path of ray ART, is the ⅛ plate 30 (i.p.) relocated from the position occupied in the substituted interferometer of the Imported Patent. The said plate just covers the cross-section of the reference interferometer beam, which means that it is not in the way of the main interferometer beam.

The functions of the optical elements depicted in FIG. 5 hereof are best appreciated by following the path of the axial ray AR emerging from the collimating parabolic mirror 20 (i.p.) as if the path of said ray were not in fact obstructed first by the small mirror 26 (i.p.) for inserting the beam of the reference laser 25 (i.p.) into the core of the collimated beam issuing from parabolic mirror 20 (i.p.) and later by the mirror 28 (i.p.) for recovering the reference laser beam. In a collimated beam the optical behaviour of the axial ray fairly well represents the behaviour of any ray in the beam. Ray AR first meets the upper face of the parallelepipedal slab 8A at an angle of approximately 45 degrees and is refracted through the slab 8A before impinging upon the beam splitting layer 8A2 (see also FIG. 3), whereat it is split into two parts of approximately equal intensities, one part, ARR, being reflected and the other, ART, transmitted.

Ray ARR is reflected back through the slab 8A and, therefore, suffers retardation, before emerging at approximately right angles to the path of AR when entering monolithic unit 8. Ray ARR now impinges upon mirror layer 9A2 of slab 9A of monolithic unit 9, is reflected onto the mirror layer 9B2 of slab 9B, emerges along a path parallel to the entry path into unit 9 and then completes its forward travel by impinging upon the mirror layer 4B of single return mirror 4, which returns it along a reverse path substantially coincident with the forward path to the beam splitting layer 8A2.

Ray ART crosses the air space AS (FIG. 3 offers a better indication), is reflected back into it by the backing mirror layer 8B2 and is refracted through the slab 8A, thus compensating for the retardation suffered by ARR, to emerge into a path which is approximately at right angles to the original path of AR before it entered unit 8 and is accurately parallel to the path of ray ARR exiting from unit 9. ART then impinges upon the mirror layer 4B of single return mirror 4, thus completing its forward travel, and is reflected back into its reverse travel, while keeping to substantially the same path as in the forward travel. ART now passes in reverse through the slab 8A, through the air space AS and is reflected by the backing mirror layer 8B2 onto the beam splitting layer 8A2.

Rays ARR and ART having thus returned, via their respective reverse paths, to the beam splitting layer 8A2, recombine thereat in phase coincidence, since the monolithic unit 9 is in the mid-scan position. It follows that their intensities add up, with the result that the intensity of the recombined axial ray ARC is nearly equal to that of the unsplit ray AR, as stated earlier when the recombination process was described in greater detail with reference to FIG. 1. Ray ARC reaches the detector 9 (i.p.) via the air space AS, (left unobstructed by truncating the slab 8B as shown), the parabolic mirror 22 (i.p.), the sample holder 23 (i.p.) and the elliptical mirror 24 (i.p.).

Ray ARC is the axial ray of the interferometer output beam, of course. The paths of rays AR, ARR, ART and ARC are close to those of the interferometer input beam, the reflected split beam, the transmitted split beam and the recombined beam, respectively. In all the beams the reference interferometer beam is merged with the main interferometer beam but the two are handled as one beam, except in so far as the former beam is routed through the ⅛ plate 30 (i.p.) and the latter is not.

The beam travelling along the path of ray ARC is, of course, the combined reference interferometer and main interferometer output beam and corresponds to the combined output beam issuing from the substituted interferometer of the Imported patent. As in the Imported Patent, the reference interferometer output beam is extracted by the small mirror 28 (i.p.) and directed onto the laser beam sensor 27 (i.p.) by folding mirror 29; the remaining main interferometer beam is directed to parabolic mirror 22 (i.p.), which converges it onto its focal region, whereat an image of the Jaquinot stop 2A (i.p.) is formed, and is further handled in the manner described in the Imported Patent with reference to sample carrier 23 (i.p.), elliptical mirror 24 (i.p.) and detector 9 (i.p.).

It will be readily appreciated that in FIG. 5 the path lengths of rays ARR and ART between slab 8A and mirror layer 4B are unequal, particularly because ray ARR traverses the unit 9 and ray ART by-passes it. The disparity is compensated by adjusting the air space AS between layers 8A2 and 8B2, and, therefore, the path length of ray ART alone, so as to match the path length of ray ARR. Because both rays suffer refraction through slab 8A to the same extent, their optical path lengths—and not just their geometrical path lengths—are equalized at the mid-scan position of unit 9 shown in FIG. 5. In other words the optical path lengths are matched for all wavelengths of the photometric radiation.

In so far as the width of the air space AS governs the separation between the rays ARR and ART, It cannot be less than the minimum acceptable separation between the said rays. In FIG. 5, the width of the air space AS is determined entirely by the required separation because that width has been made equal to the spacing between slabs 9A and 9B in the OPD scanner 9. If for design reasons the said slabs were spaced apart by a greater amount, the excess would have to be matched by a corresponding increase in the width of the air space AS, in order to maintain matching of optical path lengths between rays ARR and ART in correspondence of the mid-scan position shown in FIG. 5. It would naturally follow that the separation between ARR and ART would be correspondingly increased.

The energy reaching the beam splitting layer 8A2 along the return paths of rays ART and ARR naturally includes contributions from radiation of differing wavelengths since the radiation source 1 (i.p.) is polychromatic. Because the OPD scanner unit 9 is in its mid-scan position, the wavefronts of rays ART and ARR of each contribution will coincide at beam splitting layer 8A2 regardless of wavelength, i.e. they will undergo constructive interference. The detector 9 (i.p.) will therefore receive substantially the full energy of the interferometer input. In other words, with the OPD scanner unit 9 stationary at the mid-scan position, the photometric radiation from source 1 (i p.) that has passed through the interferometer undergoes constructive interference over its entire spectral range. The signal generated by the said detector 9 (i.p.) is therefore at its peak, the amplitude varying with the sample under analysis and reaching its maximum, of course, when no sample is present at the sample station whereat the sample carrier 23 (i.p.) is located. As the OPD scanner 9 is rotated from one to other scanning limit, the detector 9 (i.p.) will produce an electrical output representing a double-sided interferogram of the source, if no sample is present in the sample carrier 23 (i.p.) or an interferogram of the source as modified by the sample , if a sample is present. At the intermediate angular position corresponding to mid-scan, the interferogram will display an amplitude peak referred to in the art as the centre burst. The manner in which an interferogram is generated is described in greater detail in the Imported Patent.

In the embodiment of FIG. 5, the sample under analysis is intended to be placed in carrier 23 (i.p.), downstream of the main interferometer, which is in accordance with standard practice if the sample station is located within the boundary of an FT spectrophotometer. In monitoring an industrial process by FT spectrophotometry, it is often found convenient for the sampling and analyzing functions to be performed at separate locations; the first, at a remote station where a process is carried out, and the second, at a more conveniently sited near station. It means that the FT spectrophotometer at the near station receives a radiation input which has already been modified by the sample at the remote station.

Figure 6:
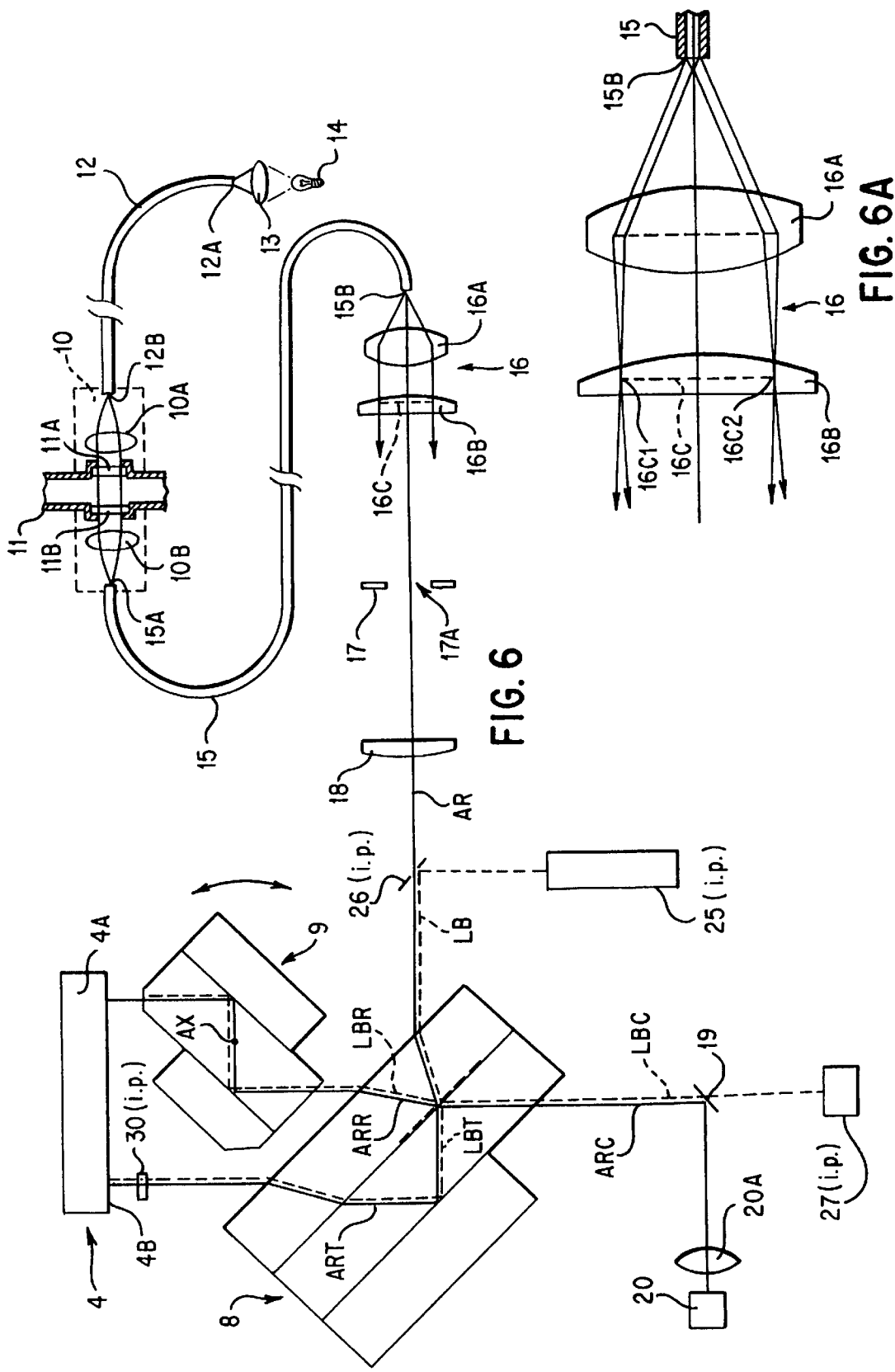
FIG. 6 is a plan view of an interferometer, in accordance with the invention, in association with optical fibre input means, as applicable to the remote sampling and analysing of a product.

The embodiment of FIG. 6 is directed to remote product monitoring. It shares the monolithic units 8 and 9 and the single return mirror 4 with the FIG. 5 embodiment, but is intended to handle an optical-fibre input. Furthermore, the main interferometer beam and the reference interferometer beam are not combined as in FIG. 5 but are routed through separate parallel paths.

In FIG. 6 it is assumed that all of the elements diagrammatically shown in FIG. 5 (i.p.) have been discarded, with the exception of the laser 25 (i.p.), the plane mirror 26 (i.p.) cooperating therewith, the sensor 27 (i.p.) and the ⅛th plate 30 (i.p.), all of which have been rearranged as shown and hereinafter described.

At the remote station, a probe 10 is fitted to a duct 11 through which a fluid product to be monitored flows, past two hermetically sealed windows 11A and 11B. The probe 10 includes a first convex lens 10A, in spaced relation with the output end 12B of an optical fibre 12, the input end of which, 12A, is located at the focus of a converging lens 13 collecting a cone of rays from a photometric source 14 in the form of a quartz-iodine tungsten filament lamp. The output end 12B of the optical fibre 12 is positioned at the focal plane of the lens 10A, which therefore produces a collimated beam passing through the window 11A, the product flowing in duct 11, and the window 11B. A second convex lens 10B focusses the collimated beam exiting from window 11B onto input end 15A of a second optical fibre 15. The optical signal thus emerging at output end 15B of fIbre 15 represents the radiation flux conveyed by the first fibre 12 after it has been modulated by the product flowing past the windows 11A and 11B. Optical fibres 12 and 15 are made of silica and are designed to provide high transmittance of the photometric radiation. They measure 0.2 mm in diameter.

The fibre termination 15B is positioned for transferring the modulated optical signal to the main interferometer represented essentially by the monolithic units 8 and 9 and the single return mirror 4. The said units function in the manner described with reference to FIG. 5, except that the main interferometer beam and the reference interferometer beam follow separate paths, as explained below. The termination 15B is optically matched via a lens system 16 that projects a magnified image thereof at the Jaquinot stop provided by aperture 17A in plate 17. Lens system 16 includes a first convex lens 16A, spaced by its focal length from the termination 15B, and a closely following plano-convex lens 16B spaced from the lens 16A by the focal length of the latter, the two lenses co-acting to image fibre termination 15B onto the Jaquinot stop 17A at an overall system magnification ratio of approximately 12/1.

Downstream of the lens system 16, a plano-convex collimating lens 18 is provided the focal plane of which coincides with the Jaquinot stop 17A, with the result that the rays emerging from the said stop are directed as a collimated bundle at the monolithic unit 8, the stop itself being imaged at infinity. In addition, the separation between the lens 18 and the lens system 16 is such that an image of the pupil stop 16C is projected onto the return mirror 4.

The "pupil stop" is a term of art. It may refer to an actual physical stop at a pupil position, as in the case of aperture 17A (i.p.) in baffle plate 17 (i.p.) of FIG. 4 (i.p.), or it may refer to the boundary of a pupil as geometrically defined by the peripheral intersections of diametrically opposed marginal rays, as in the present embodiment.

Two of the numerous intersections delimiting the pupil stop 16C stop are shown at 16C1 and 16C2 in FIG. 6A, in which certain rays emanating from the termination 15B are traced through the lens system 16. The tracing has not been continued through Jaquinot stop 17A and lens 18 to avoid congestion, the only ray shown being the axial ray AR.

In the diagrammatic plan view of FIG. 6, the axial rays of the main interferometer beam and the reference interferometer beam could not be drawn as spaced apart since the two beams are in fact spaced along a vertical of the monolithic unit 8, and hence the monolithic unit 9: in the plan view of units 8 and 9 the upper ray "hides" the lower. In order to distinguish them, the axial ray AR of the main interferometer beam is shown as a solid line and the axial ray LB of the reference interferometer beam as a closely adjacent dashed line. The progress of the axial ray AR issuing from the collimating lens 18 and the splitting and recombining thereof is as described with reference to FIG. 5 hereof for rays AR, ARR, ART and ARC. In FIG. 6 the recombined ray ARC reaches a thermoelectrically cooled indium gallium arsenide detector 20 via deflecting mirror 19 and convex lens 20A adapted to just fill the sensitive surface of detector 20 with the available radiation energy.

Repositioned laser 25 (i.p.) and small mirror 26 (i.p.) co-operate in directing the laser beam along a path parallely spaced all along from the ray AR of the main interferometer. There are therefore identified a laser beam axial ray LB, split into a reflected portion LBR and transmitted portion LBT, which are recombined into a ray LBC that is admitted to the sensor 27 (i.p.).

The transmitted ray portion LBT—but not the transmitted ray portion ART, of course—traverses the ⅛ plate 30 (i.p.) relocated from the position shown in FIG. 5 (i.p.) and, after reflection from the mirror 4, retraverses it in the opposite direction. The function of plate 30 (i.p.) is described in the Imported Patent (see from end paragraph on page 39 to end of first paragraph on page 41).

The monolithic unit 8 incorporated in the FIG. 6 embodiment comprises the beam splitting layer 8A2 depicted in FIG. 3, which is shared by rays AR and LB. Another alternative is to provide two separate layers side by side: one, receiving the AR ray, optimized for performance in the wavelength band of the polychromatic source 14; and the other, receiving the LB ray, optimized for the wavelength of the monochromatic reference source represented by laser 25 (i.p.). Optimization of the optical function is achieved by suitable choice and arrangement of layered materials, in known manner. In FIG. 3B, two such layers are shown as a modification of the single layer 8A2 depicted in FIG. 3: layers 8A2A and 8A2B, optimized for the reference interferometer beam and the main interferometer beam, respectively.

Figure 7:
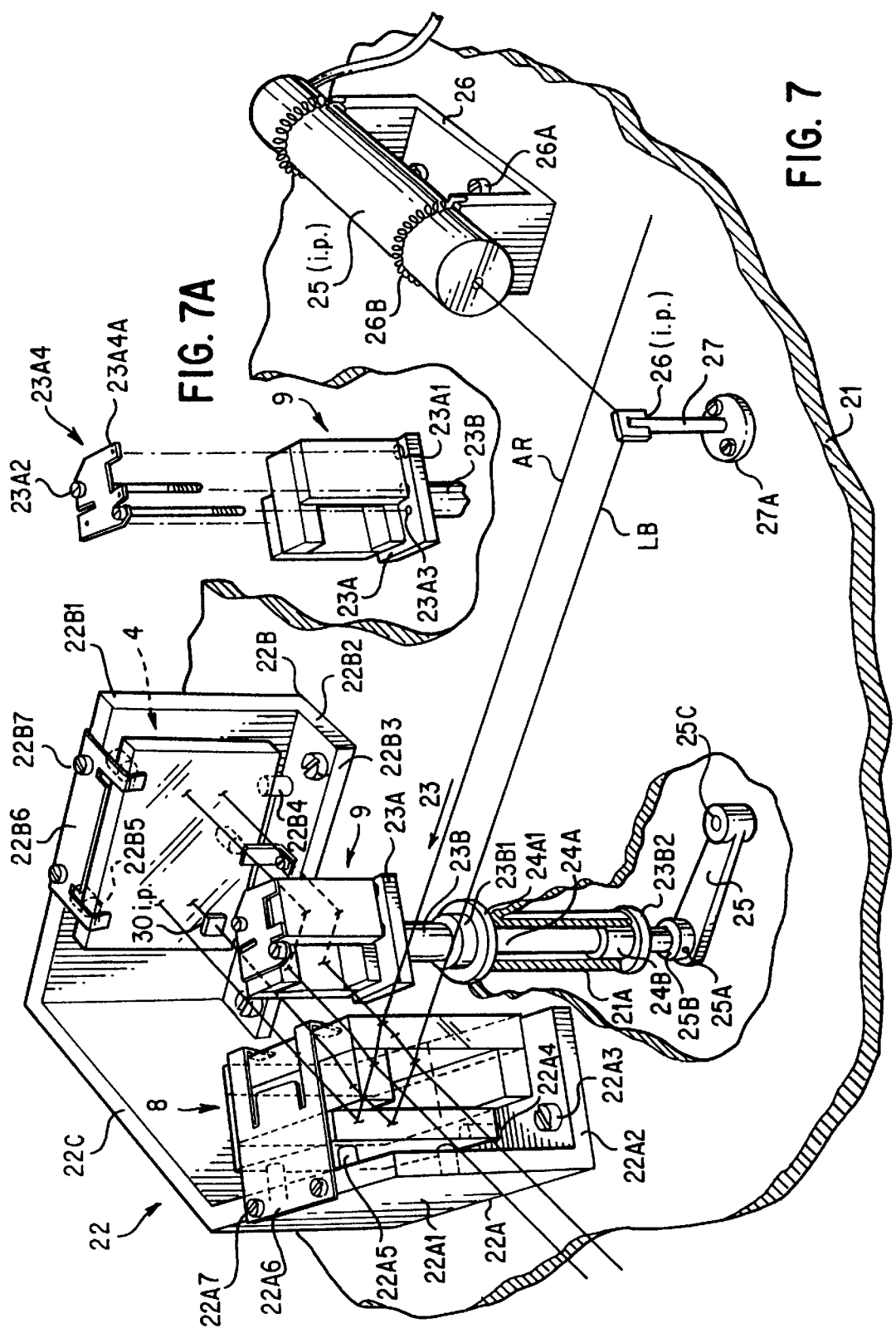
FIG. 7 is a perspective view of a structural layout applicable to the interferometers of FIGS. 5 and 6, respectively.

The embodiments of FIG. 5 and FIG. 6 are distinctly different from each other but make use of the same basic arrangement of co-operating monolithic units 8 and 9 and single return mirror 4. FIG. 7 illustrates a structural layout of such arrangement that, with incidental minor variations, may be incorporated in the implementation of either embodiment. FIG. 7 has been drawn with the aim of emphasizing the main structure in accordance with the invention that is common to the two different embodiments.

Whilst both FIG. 5 and FIG. 6 include a tracing of the axial rays, the perspective nature of FIG. 7 has offered an opportunity to show the separate paths of the two axial rays which, for the reason explained earlier, could not be shown in the plan view of FIG. 6. In FIG. 7 the structural components bear the same references as those of their diagrammatic counterparts in FIGS. 5 and 6. The Imported Patent figure numbers and drawing references are, again, identified by adding (i.p.) to them. The functions of the elements common to the two figures and the optical path of the axial ray AR are as described with reference to FIG. 5. The description that follows will first be directed to the mounting of the various components shown in perspective. Units 8 and 9 are to be regarded as single components since they are of monolithic construction.

All the components shown in FIG. 7 are supported on a base plate 21. Those identified diagrammatically in FIGS. 5 and 6 are mounted as follows: the monolithic unit 8 and the return mirror 4 via a structure 22 integrally defining bracket 22A, for retaining the unit 8, and bracket 22B, for retaining the mirror 4, the said brackets having upright limbs 22A1 and 22B1, linked by a stiffening wall 22C, and horizontal limbs 22A2 and 22B2 for affixing the structure 22 by means of screws 22A3 (the rearmost 22A3 screw is obscured) and 22B3; the monolithic unit 9 via a support assembly 23 comprising platform 23A, upon which the unit 9 is held by means presently to be described, said platform extending into a shaft 23B rotatable in upper sleeve bearing 24A and lower sleeve bearing 24B, both a force fit in a cylindrical housing 21A extending from the underside of base plate 21, endwise location of the shaft 23B being provided by upper shaft collar 23B1 and lower shaft collar 23B2 abutting against flange 24A1 of bearing 24A and bottom end of bearing 24B, respectively, and the collars being fastened to the shaft 23B each by a pair of grub screws (not shown).

The manner in which unfit 8 and mirror 4 are held in the supporting structure 22 and the unit 9 in support assembly 23 will now be described with continued reference to FIG. 7, but, in the case of unit 9 with additional reference to the exploded view of FIG. 7A.

Integral with each of horizontal limbs 22A2 and 22B2 is a pair of spaced bottom pads 22A4 and 22B4, on which rest the monolithic unit 8 and the mirror 4, respectively (only the front member of each pair is partially visible, the rear member of the first pair being ghosted and that of the second pair obscured). Integral with each of upright limbs 22A1 and 22B1 is a set of three backing pads, 22A5 and 22B5, arranged at the corners of a notional upturned equilateral triangle and providing a three-point abutment for the backs of unit 8 and mirror 4, respectively (only the top front member of the first set is clearly visible and the remainder are largely or totally ghosted). Each of units 8 and 9 is held in abutment with the associated pads by three spring clips, 22A6 and 22B6, respectively: two at the top and one at the bottom. The top clips are integrally formed, as shown, in a springy metal strip secured by screws 22A7 and 22B7 to upright limbs 22A1 and 22B1, respectively. The bottom 22A6 clip is ghosted but its counterpart 22B6 is fully visible. Each clip is adapted to apply a slight compressive force directly in line with the associated backing pad to ensure that the optical units are not subjected to bending forces that might introduce mechanically-induced distortions of the optical elements.

In an alternative arrangement, the upright limbs 22A1 and 22B1, as well as the stiffening wall 22C, are replaced by mechanically similar walls integral with a base casting. The horizontal limbs 22A2 and 22B2 are dispensed with altogether and the bottom pads 22A4 and 22B4 as well as the pads 22A5 and 22B5 are also formed in the base casting. The base plate 21 is substituted by a flat area of the base casting.

The unit 9 rests on three supporting pads 23A1 integrally raised from the platform 23A and is held in place by two long screws 23A2 engaging tapped holes 23A3 in the platform 23A and extending outside the paths of the beams of which AR and LB represent the axial rays, respectively. Screws 23A3 co-operate with a foil of beryllium copper 23A4, provided with spring fingers 23A4A, in causing the said fingers to bear resiliently on the outer members of the unit 9 so as to urge the said unit against the pads 23A1.

A description of the drive for producing the scanning motion of unit 9 now follows. The lower end of shaft 23B is made fast to a scan drive arm 25 by means of a pin 25A driven through a bush 25B and the shaft 23B, the bush 25B being a forced fit into a circular hole (not shown) provided at one end of drive arm 25. At the opposite end, arm 25 ends in a boss 25C which should be regarded as taking the place of boss 11C1 (i.p.) in FIG. 5 (i.p.), to which figure the rest of the i.p. references in this paragraph relate. Drive means for rotating the shaft 23B and, therefore, the monolithic scanner unit 9 between two opposite angular limits, is represented by the electric motor 37 (i.p.) co-operating with the lead screw 33A (i.p.) The translatory bidirectional motion of the lead screw 33A (i.p.) is transmitted to the arm 25 through the linkage 11C5 (i.p.) which engages the boss 25C (FIG. 6) in the manner that it engages boss 11C1 (i.p.) in FIG. 5 (i.p.). Details of the Imported Patent scan drive are given on page 33, lines 8–12, and on page 34, lines 13–25 with continuation on page 35, lines 1–14.

The axial rays AR and LB of the main interferometer and reference interferometer beams, respectively, are traced in FIG. 7. When taken as a pair, they represent the optical input arrangement in accordance with the FIG. 6 embodiment. However, either of said axial rays might equally well represent the single axial ray AR traced in FIG. 5, which ray would however be shown on a path intermediate between those of AR and LB in FIG. 7 for an efficient utilization of the available working area of the beam splitting layer 8A2.

The ⅛ plate 30 (i.p.) shown in FIG. 7 is located to suit the FIG. 6 embodiment, wherein the main interferometer beam and the reference interferometer beam are kept spaced apart, but could be readily relocated to suit the FIG. 5 embodiment, wherein the reference interferometer beam occupies the core of the main interferometer beam. The same laser is used in both embodiments and since the plate must only be traversed by the laser beam, the FIG. 5 requires a plate the area of which matches the cross section of the laser beam whereas the FIG. 6 embodiment could tolerate a larger area, as long as it did not extend into the path of the separate main interferometer beam, but would find a matching area equally satisfactory. In other words, a matching area would suit both embodiments. The area of the ⅛ plate shown in FIG. 7 is purely indicative of a matching area or a slightly larger area. The plate is supported upon horizontal limb 22B2 by means of a slender stanchion (not shown).

The relocation of the laser 25 (i.p.) and cooperating mirror 26 (i.p.) is specific to the FIG. 6 embodiment and is the direct result of keeping axial rays AR and LB on separate paths through the interferometer.

No input or output means are actually shown in FIG. 7 in order to detract as little as possible from the emphasis on the structural common ground between the FIG. 5 and FIG. 6 embodiments. It Is however true that essential output means of the Imported Patent which have been adopted for the FIG. 5 embodiments are partly retained for the FIG. 6 embodiment with some relocation of parts. The input means, however, are quite distinct, largely because An the FIG. 6 embodiment the optical input is modulated by the sample ahead of the interferometer and is conveyed to the interferometer by an optical fibre.

It will have been appreciated that although the embodiments, as hereinbefore described, of an FT spectrophotometer in accordance with the present invention differ fundamentally in the way the interferometer optics has been structured from the embodiment described in the Imported Patent, the general form of the electrical signals transduced from the optical signals remains substantially the same, to the point that the arrangement described in the Imported Patent for processing the data signals equally serves for processing the corresponding signals produced by the embodiments of the present invention, which corresponding signals nevertheless reflect enhanced stability and hence performance.

It is well established that the stability of an FT spectrophotometer essentially depends on that of the interferometer with which It is fitted. It follows that if exceptionally high stability figures are achieved for the FT spectrophotometer as a whole, it may be safely assumed that they are due to an intrinsically stable interferometer structure.

The FT spectrophotometer of the Imported Patent adapted for integration with the interferometer of FIG. 7 in the manner hereinbefore described was subjected to stability tests over a continuous period of 36 days, during which the interferometer was made to perform 3.5 million OPD scanning cycles, in order to establish the percentage variation with time in the output energy recorded at the 100% transmittance level. No precautions were taken to minimize external perturbations and no attempt was made to refine the stability of the FT spectrophotometer which was designed for use as a laboratory instrument.

It was found that the high transmittance level of the FT spectrophotometer remained stable within 1%, in the 1-micron region of the spectrum; and to within 0.75%, in the 2-micron region. By first allowing the instrument to settle down for an operative continuous period of 13 days and then extending that period by a further continuous period of 23 days, it was found that transmittance level during the second period remained stable within 0.5%, both in the 1-micron and 2-micron spectral regions. The tests, therefore, provide confirmation of exceptional ordinate stability.

It was also verified that during the 36-day test period referred to above the positioning of the interferogram on the abscissa, relative to the data collection points determined by an HeNe reference laser, suffered no detectable shift.

Such a high ordinate and abscissa stability testify to the high stability of an FT spectrophotometer incorporating an interferometer in accordance with the present invention, and hence of the interferometer on which such performance predominately depends. An even better performance could be reasonably expected if the spectrophotometer itself were refined to achieve exceptionally high stability.

The embodiments described above are what are known as two port interferometers, that is to say one port or aperture is the input (infra-red or laser beam) and the other port is an output (infra-red or laser beam). This applies even if the infra-red and laser beams propagate in opposite directions. Energy injected into one port will split with some emerging at the other port and some being reflected back to the one port. As has been described the two port interferometer of the present embodiments uses a common return mirror for both beams. This mirror is generally perpendicular to the beams and the beams, therefore, return along the same paths forward beams. In some situations this can cause unwanted reflections.

An alternative type of interferometer is a four port interferometer. In such an interferometer the return beams do not follow the same paths forward beams, but recombine at a separate beam recombiner (physically identical to the beam splitter). In some cases this can be a different region of the beam splitter and in the case of polarised interferometers can be the same area, but different polarisation. The consequence is that there are two separate output beams physically separate from the input beam and there are two choices of position for the input beam, hence four ports.

Figure 8:
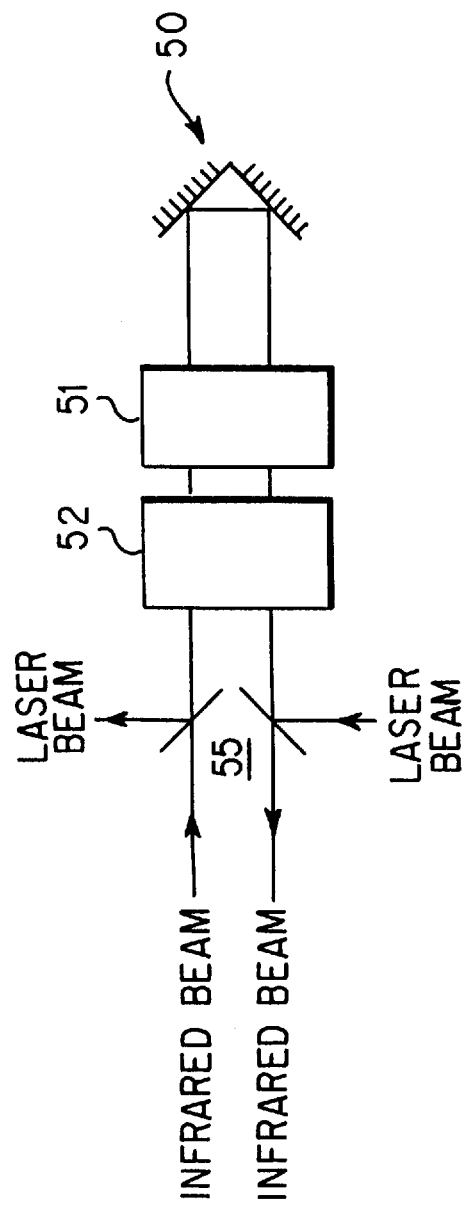
FIG. 8 is a schematic illustration of a modified interferometer in accordance with the present invention.

The present interferometer can be converted into a four port interferometer by substituting for the single return mirror a roof top type mirror which is formed of two mirrors set with their planes at right angles, and at 45 degrees to a horizontal plane passing through their point of intersection. The intersection of the mirrors lies in a horizontal plane perpendicular to the forward paths. Such an arrangement is shown schematically in FIG. 8 of the drawings. In FIG. 8 the two mirrors making up the roof top mirror are shown at 50, 51 is a tuning pair and 52 is a beam splitter and backing mirror. The two semi reflecting mirrors shown generally at 55 constitute a dichroic splitter and beam recombiner. In operation the two beams propagating towards the rooftop mirror 50 strike the top mirror and are deflected through 90 degrees onto the bottom mirror from where they are reflected back towards the tuning pair and beam splitter along paths parallel to the forward beams, but at a lower level. At the beam splitter and recombiner 55 the beams recombine to provide the two output beams which are physically separate from the input beam.

This modification retains the advantages of the two port devices described in detail above in that it is insensitive to minor misalignment of mirrors. For example any error in the angle between the two mirrors forming the rooftop mirror affects both beams equally and therefore does not affect the parallelism of the recombined beams. Thus it will be seen that by substituting a single roof top type mirror for the planar return mirror of the two port arrangement it is possible to convert the two port arrangement into a four port arrangement.

We claim:

1. An optical instrument which uses a beam splitter/combiner assembly to produce two parallel light beams from an incoming light beam, and to recombine such beams, wherein said beam splitter/combiner comprises a flat first plate having parallel sides, one of said sides being a light entry side, said plate being transparent to said light, said plate having part of one surface partially reflecting, a reflecting surface mounted in spaced parallel relationship to said first plate, said reflecting surface facing the partially reflecting surface of the first plate, the arrangement being such that a light beam incident on said light entry side of said first plate traverses the thickness of said first plate to be partially reflected by said partially reflecting surface to thereby produce a first beam, which propagates back through the thickness of the first plate, and the partially transmitted portion propagates to said reflecting surface and is reflected therefrom so that it passes through a non-reflecting part of the said surface of said first plate and through the thickness of the first plate to produce said second beam substantially parallel to said first beam, so that said two beams propagate a corresponding distance through said first plate.

2. An optical instrument according to claim 1, wherein the beam splitter/combiner assembly is a monolithic device in which the reflecting surface is formed on a second plate and said first plate and second plate are mounted upon spaced parallel slabs to thereby define an air gap between the plates.

3. An optical instrument according to claim 2, wherein the slabs and the second plate are made from a common material.

4. An optical instrument according to claim 2, wherein the slabs, and the first and second plates are all made from a common material.

5. An optical instrument according to claim 1, wherein the instrument is a Michelson type interferometer having means for producing a collimated input beam which propagates to said beam splitter/combiner, an optical path difference scanning means arranged to receive one of said beams, and a single beam return means common to both beams for returning the beams incident thereon along a path corresponding to the incident path.

6. An optical instrument according to claim 5, wherein the interferometer is an FT-IR interferometer.

7. An interferometer according to claim 5, wherein the single return means comprises a single flat mirror.

8. An interferometer according to claim 5, wherein the single return means comprises a rooftop type mirror.

9. An interferometer according to claim 5, wherein the optical path difference scanning means comprises a pair of spaced parallel plates having reflecting surfaces disposed in facing relationship, said plates being mounted for rotation around an axis parallel to said reflecting surfaces.

10. An optical instrument which uses a beam splitter/combiner assembly to produce two parallel light beams from an incoming light beam, and to recombine such beams, wherein said beam splitter/combiner comprises a flat first plate transparent to said light and having a first light entry surface, said plate having a second surface parallel to said first surface, a part of said second surface being partially reflecting, a reflecting surface mounted in spaced parallel relationship to said second surface of said first plate, said reflecting surface facing the partially reflecting surface of the first plate, the arrangement being such that a light beam incident on said first plate traverses the thickness of said first plate to be partially reflected by said partially reflecting surface to thereby produce a first beam, which propagates back through the thickness of the first plate, and the partially transmitted portion propagates to said reflecting surface and is reflected therefrom so that it passes through a non-reflecting part of said second surface of said first plate and through the thickness of the first plate to produce said second beam substantially parallel to said first beam, so that said two beams propagate a corresponding distance through said first plate.

11. An optical instrument according to claim 10, wherein the beam splitter/combiner assembly is a monolithic device in which the reflecting surface is formed on a second plate and said first plate and second plate are mounted upon spaced parallel slabs to thereby define an air gap between the plates.

12. An optical instrument according to claim 11, wherein the slabs and the second plate are made from a common material.

13. An optical instrument according to claim 11, wherein the slabs, and the first and second plates are all made from a common material.

14. An optical instrument according claim 10, wherein the instrument is a Michelson type interferometer having means for producing a collimated input beam which propagates to said beam splitter/combiner, an optical path difference scanning means arranged to receive one of said beams, and a single beam return means common to both beams for returning the beams incident thereon along a path corresponding to the incident path.

15. An optical instrument according to claim 14, whereon the interferometer is an FT-IR interferometer.

16. An interferometer according to claim 14, wherein the single return means comprises a single flat mirror.

17. An interferometer according to claim 14, wherein the single return means comprises a rooftop type mirror.

18. An interferometer according to claim 14, wherein the optical path difference scanning means comprises a pair of spaced parallel plates having reflecting surfaces disposed in facing relationship, said plates being mounted for rotation around an axis parallel to said reflecting surfaces.

* * * * *